US008204896B2

(12) United States Patent
Hirabayashi

(10) Patent No.: US 8,204,896 B2
(45) Date of Patent: Jun. 19, 2012

(54) IMAGE PROCESSING APPARATUS AND IMAGE PROCESSING METHOD

(75) Inventor: Kazunori Hirabayashi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 496 days.

(21) Appl. No.: 12/349,993

(22) Filed: Jan. 7, 2009

(65) Prior Publication Data
US 2009/0177653 A1 Jul. 9, 2009

Related U.S. Application Data

(60) Provisional application No. 61/019,787, filed on Jan. 8, 2008.

(51) Int. Cl.
*G06F 7/00* (2006.01)
*G06F 17/30* (2006.01)
(52) U.S. Cl. ....................... 707/758; 707/769
(58) Field of Classification Search .................. None
See application file for complete search history.

(56) References Cited

U.S. PATENT DOCUMENTS

| 5,784,487 | A | * | 7/1998 | Cooperman | 382/175 |
| RE40,731 | E | * | 6/2009 | Bookman et al. | 1/1 |
| 2005/0229099 | A1 | * | 10/2005 | Rogerson et al. | 715/523 |
| 2006/0274388 | A1 | * | 12/2006 | Miyazawa et al. | 358/527 |

FOREIGN PATENT DOCUMENTS

| JP | 2002-183165 | 6/2002 |
| JP | 2004-348774 | 12/2004 |
| JP | 2006-350551 | 12/2006 |

* cited by examiner

*Primary Examiner* — Jay Morrison
(74) *Attorney, Agent, or Firm* — Turocy & Watson, LLP

(57) ABSTRACT

In an image processing apparatus according to the present invention, a scanning unit reads out image information regarding original document; an analyzing unit extracts layout information regarding character regions and character addition information added to characters within the character regions from the image information; an OCR processing unit converts the character regions included in the layout information extracted by the analyzing unit into character information; an extracting unit extracts one or more keywords comprised of a plurality of characters from the character information; a searching unit obtains meta-information by use of the extracted keywords; and an electronic document generating unit generates an electronic document according to description of a predetermined format by adding the meta-information to the character information. According to the present invention, it is possible to properly add secondly available information to electronized information.

19 Claims, 8 Drawing Sheets

IMAGE PROCESSING APPARATUS AND IMAGE PROCESSING METHOD

CROSS-REFERENCE TO RELATED APPLICATION

This application is based upon and claims the benefit of priority from: U.S. provisional application No. 61/019,787, filed on Jan. 8, 2008, the entire contents of which is incorporated herein by reference.

TECHNICAL FIELD

The present invention relates to an image processing apparatus and an image processing method, and more in particular, to an image processing apparatus and an image processing method capable of generating electronic documents.

BACKGROUND

Conventionally, a scan function by an MFP (Multi Function Peripheral) is used for the purpose of making paper documents into electronic documents and thereafter reserving the data or reusing the data. In the scan by the MFP, a format regarding JPEG (Joint Photographic Experts Group) or a format regarding TIFF (Tagged Image File Format) is used. However, a format regarding PDF (Portable Document Format) or a format regarding XPS (XML Paper Specification) is recently used.

If the scan function by the MFP is used for the purpose of reserving the data after electronic documents are made, the data amount is required to be reduced and thus compression by the JPEG is generally used. However, although a large compression effect can be obtained in compressing a natural image by use of the JPEG, compression of a character line-drawing by use of the JPEG has a problem in that an edge portion of the character line-drawing becomes blunt. Specially, when a compression ratio increases in order to reduce a data size after encoding, the bluntness of the edge portion in the character line-drawing is notable.

Meanwhile, a method is proposed that, in a format capable of describing a structure of a document such as the PDF or the XPS, a character region, a background region and an image region are extracted by a layout analysis technique such that a compression ratio may be compatible with an image quality. The most suitable compression method for each of the extracted regions is selected for compression and thus a high compression efficiency can be accomplished as a whole. Such compression method is generally called "a high compression PDF" or "a high compression XPS."

When using the PDF or the XPS, it is possible not only to reserve image information but also to reserve meta-information other than image information in a format. As a conventional technique, the following technique is additionally known. That is, in this techniques character regions of a title or date of a sentence and a reporter are extracted by the layout analysis technique, and search keywords are added to the extracted character regions as an electronic document by use of an OCR (Optical Character Reader) function, the search keywords being added as a table of contents. An added value is given that a character object, which is image data, is vectorized. The extracted keywords are transmitted to a search site as a search query (request for question) and a result acquired from the search site is displayed together with an input image. These techniques are disclosed in JP-A-2006-350551, JP-A-2004-348774, JP-A-2002-183165 and JP-A-11-184924.

In the prior art, keywords are extracted by executing the OCR, the extracted keywords are transmitted to a search site as search query (request for question) and a search result is obtained from the search site. However, a user can have access to search information by use of only a dedicated device and further the user should explicitly indicate keywords in reserving data. Especially, if a user makes a large amount of paper documents into electronic documents, the user is required to input one by one, which is very inconvenient for the user.

In JP-A-2006-350551, all data cannot be utilized since the data is used for only generation of a table of contents even in the use of OCR. In JP-A-2004-348774, although a system is proposed which extracts keywords and then simultaneously displays a search result from a search engine together with an original document by a browser present in the system, a dedicated system is necessary and thus it is inconvenient in view of use of an input document. In JP-A-2002-183165, the technique searches for keywords from a document and enables a user to select a search query. However, it cannot be applied except for a search after processing.

SUMMARY

The present intention is designed in consideration of such problems and is directed to provide an image processing apparatus and an image processing method capable of suitably adding secondly available information to electronized information.

An image processing apparatus according to one aspect of the present invention, in order to solve the above-described problems, includes: a scanning unit configured to scan image information regarding original document; an analyzing unit configured to extract layout information regarding character regions and character addition information added to characters within the character regions from the image information scanned by the scanning unit; an OCR processing unit configured to convert the character regions included in the layout information extracted by the analyzing unit into character information; an extracting unit configured to extract one or more keywords comprised of a plurality of characters from the character information converted by the OCR processing unit; a searching unit configured to search by use of the keywords extracted by the extracting unit and generate meta-information with use of search information; and an electronic document generating unit configured to generate an electronic document according to description of a predetermined format by adding the meta-information to the character information.

An image processing method according to one aspect of the present invention, in order to solve the above-described problems, includes: scanning image information regarding original document; extracting layout information regarding character regions and character addition information added to characters within the character regions from the scanned image information; converting the character regions included in the layout information into character information; extracting one or more keywords comprised of a plurality of characters from the converted character information; searching by use of the extracted keywords and generating meta-information with use of search information; and generating an electronic document according to description of a predetermined format by adding the meta-information to the character information.

An image processing apparatus according to another aspect of the present invention, in order to solve the problems, includes: a data generating unit configured to analyze a file generated as a predetermined format to generate bitmap data; an analyzing unit configured to extract layout information regarding character regions and character addition information added to characters within the character regions from the bitmap data generated by the data generating unit; an OCR processing unit configured to convert the character regions included in the layout information extracted by the analyzing unit into character information; an extracting unit configured to extract one or more keywords comprised of a plurality of characters from the character information converted by the OCR processing unit; a searching unit configured to search by use of the keywords extracted by the extracting unit and generate meta-information with use of search information; and an electronic document generating unit configured to generate an electronic document according to description of a predetermined format by adding the meta-information to the character information.

DESCRIPTION OF THE DRAWINGS

In the accompanying drawings.

DETAILED DESCRIPTION

Hereinafter, embodiments of the present invention will be described with reference to the accompanying drawings.

First Embodiment

Figure 1:
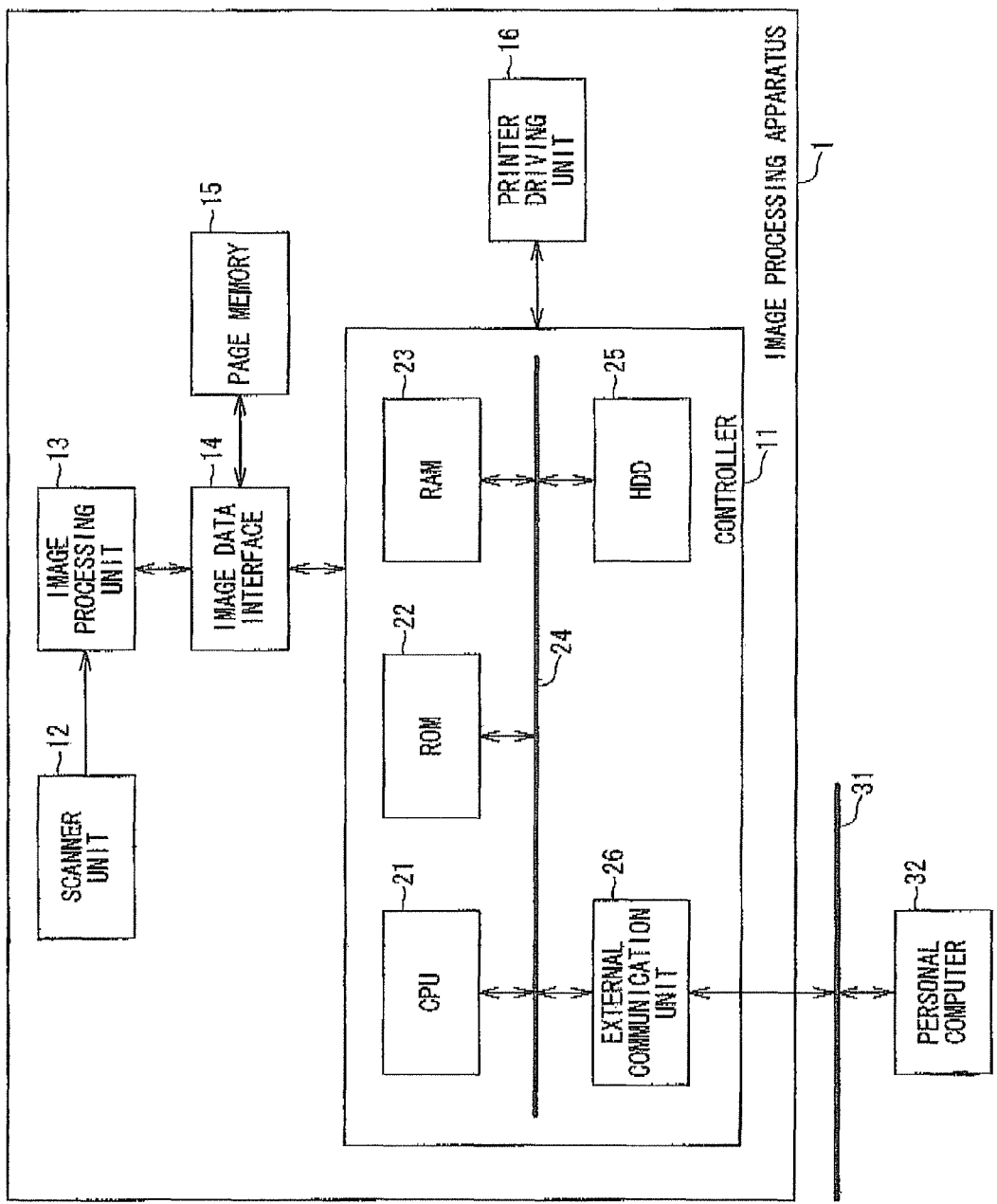
FIG. 1 is a block diagram to illustrate an internal configuration of an image processing apparatus related to the present invention.

FIG. 1 illustrates an internal configuration of an image processing apparatus 1 related to the present invention. As shown in FIG. 1, the image processing apparatus 1 includes a controller 11, a scanner unit 12, an image processing unit 13, an image data interface 14, a page memory 15 and a printer driving unit 16. The controller 11 includes a CPU (Central Processing Unit) 21, a ROM (Read Only Memory) 22, a RAM (Random Access Memory) 23, a bus 24, an HDD (Hard Disk Drive) 25 and an external communication unit 26. The CPU 21 executes a variety of processings depending on programs stored in the ROM 22 or a variety of application programs loaded to the RAM 23 from the HDD 25, and also generates various control signals for supply to each of the elements, thereby controlling the image processing apparatus 1 as a whole. The RAM 23 properly stores data required for the CPU 21 executing a variety of processings. The CPU 21, the ROM 22, the RAM 23 and the HDD 25 are connected to one another via the bus 24. In addition, the external communication unit 26 configured of a modem, a terminal adaptor and a network interface is connected to the bus 24. The external communication unit 26 communicates via a network 31.

The image data interface 14 and the printer driving unit 16 are connected to the controller 11. The image processing unit 13 and the page memory 15 are connected to the image data interface 14. The scanner unit 12 is connected to the image processing unit 13.

Here, a flow of image data upon forming an image will now be described.

If an original document is mounted on a glass of a document plate, the scanner unit 12 scans image data of the original document, and the scanned image data is supplied to the image processing unit 13. The image processing unit 13 acquires the image data of the original document supplied from the scanner unit 12 and then performs a shading correction, various filtering, a gray scale processing and a gamma correction for the acquired image data. The image data after such processings is stored in the page memory 15 via the image data interface 14, if needed.

The printer driving unit 16 is comprised of an optical unit, and an image forming unit capable of forming an image on a paper as a medium on which an image is formed. The printer driving unit 16 drives the optical unit and the image forming unit by the control of the controller 11.

Figure 2:
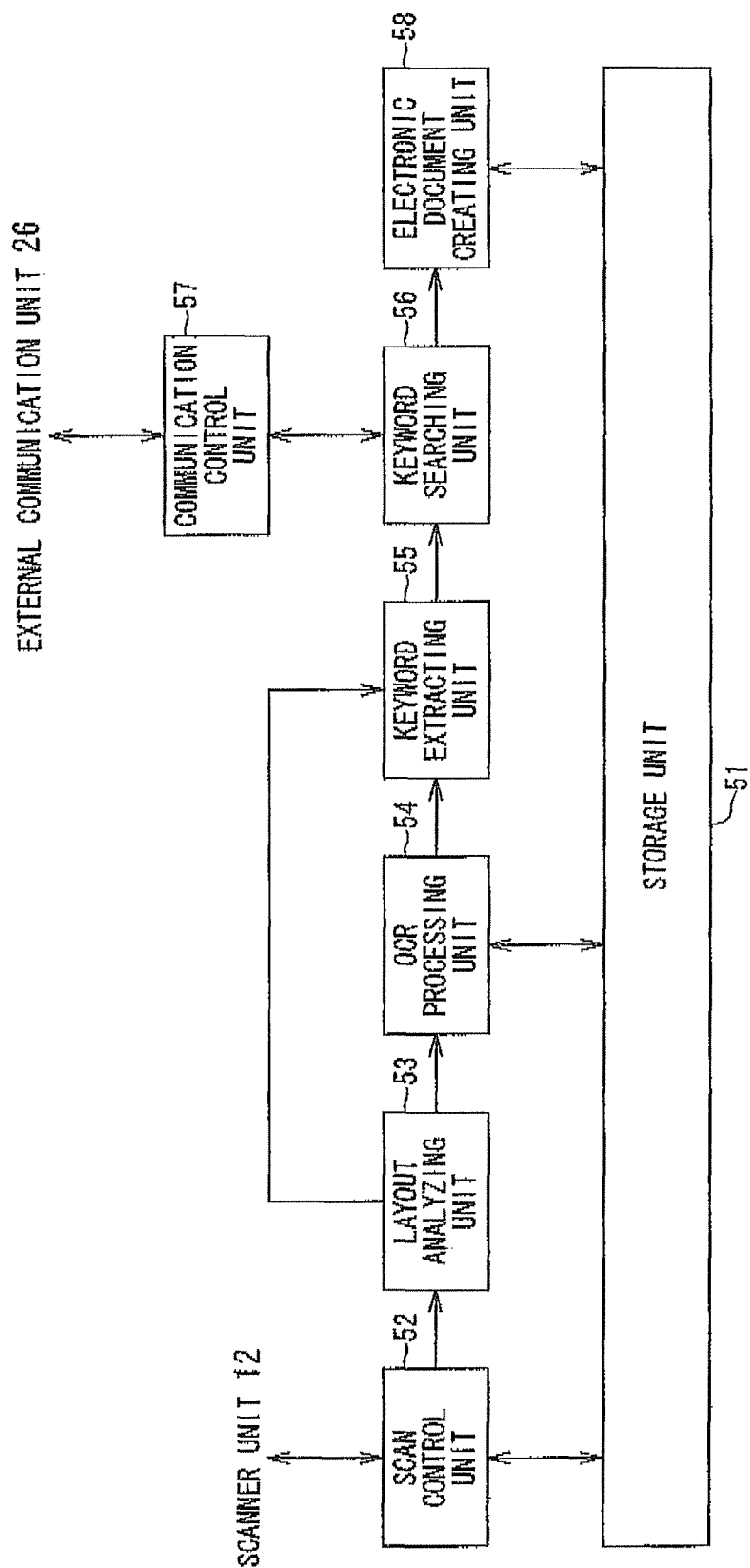
FIG. 2 is a diagram to illustrate a functional configuration executable by a CPU of a controller related to the first embodiment of the present invention.

FIG. 2 is a diagram to illustrate a functional configuration executable by the CPU 21 of the controller 11 related to the first embodiment of the present invention. As shown in FIG. 2, the image processing apparatus 1 includes, as a characteristic configuration, a scan control unit 52, a layout analyzing unit 53, an OCR processing unit 54, a keyword extracting unit 55, a keyword searching unit 56, a communication control unit 57 and an electronic document generating unit 58. Such configuration is mounted on the CPU 21 as software.

A storage unit 51 is comprised of the HDD 25 of the controller 11 and stores various data if needed. The scanner control unit 52 controls the scanner unit 12 to scan the image data for which various image processings are performed after scanning by the scanner unit 12, via the image data interface 14, and stores the scanned image data into the storage unit 51 or the RAM 23 of the controller 11. The layout analyzing unit 53 reads the image data as a scan data stored in the storage unit 51 or the RAM 23 the image data being a scan data, and extracts layout information regarding character regions or image regions from the read image data. In addition, the layout analyzing unit 53 extracts character addition information which is being drawn with the characters at the same time, from the read image data. The character addition information which is being drawn with the characters at the same time is a characteristic amount which is arbitrarily added to each character. The character addition information includes information such as a color of a character, netting of a character or an underline or the like.

The OCR processing unit 54 converts the character region included in the layout information extracted by the layout analyzing unit 53 into character information. To be more specific, OCR processing unit 54 divides the character region included in the layout information extracted by the layout analyzing unit 53 into regions such as a character string, a chart, a photograph, etc. The OCR processing unit 54 cuts off a character per one character from the obtained character string, recognizes a character with respect to the cut-off character and converts a character into character information. The character information is composed of vector data. The character information includes information regarding a position of the recognized character. The OCR processing unit 54 supplies the converted character information to the keyword extracting unit 55 and also to the storage unit 51 or the RAM 23 of the controller 11. The storage unit 51 or the RAM 23 of the controller 11 stores the character information supplied from the OCR processing unit 54.

The keyword extracting unit 55 extracts characteristic characters, as a keyword, from a sentence configured of a plurality of characters based on the character information supplied from the OCR processing unit 54. The keyword extracting unit 55 extracts the characteristic characters (keyword) from the sentence, based on an image characteristic obtained at the time point of the layout analyzing unit 53 analyzing the layout or meaningful characteristic by a natural language analysis.

The keyword extracting unit 55 supplies the keyword information regarding the characteristic characters (keyword) extracted from the sentence to the keyword searching unit 56. The keyword searching unit 56 obtains the keyword information supplied from the keyword extracting unit 55, uses a search service or a dictionary service on a Web site via the communication control unit 57 by use of the obtained keyword information and obtains a search result. The keyword searching unit 56 generates meta-information with use of the obtained search result to be supplied to the electronic document generating unit 58. The electronic document generating unit 58 obtains receives the meta-information generated by the keyword searching unit 56 and reads the character information stored in the storage unit 51. The electronic document generating unit 58 generates an electronic document according to a description of a PDF format or an XML format, based on the read character information. In this case, the electronic document generating unit 58 associates information regarding the position of the character included in the character information with the obtained meta-information and thereby adds the meta-information to the character information for generating an electronic document.

Figure 3:
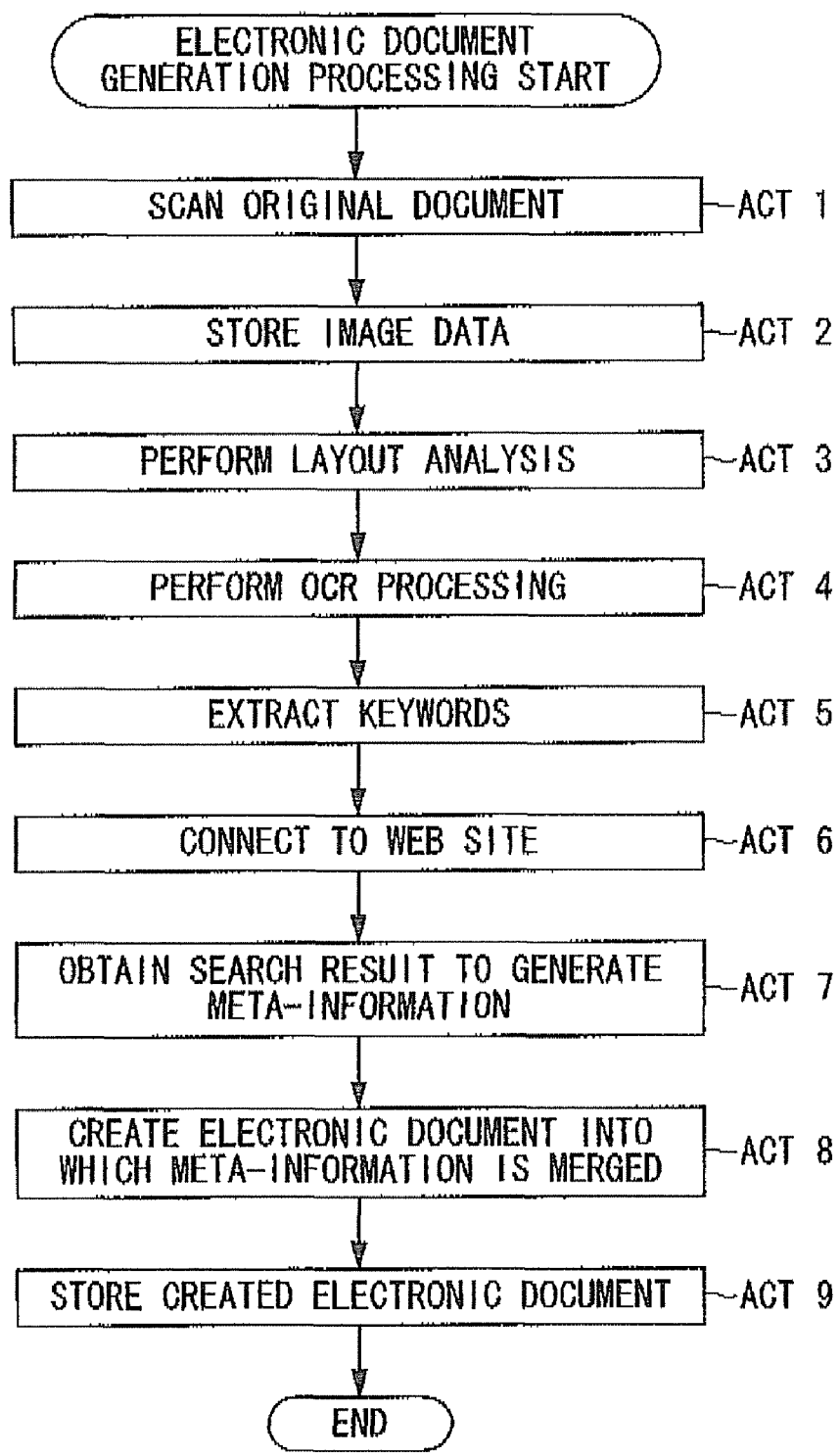
FIG. 3 is a flowchart to illustrate an electronic document generation processing in the image processing apparatus shown in FIG. 2.

Subsequently, the generation processing of electronic document by the image processing apparatus 1 in FIG. 2 will be described with reference to the flowchart shown in FIG. 3.

At Act 1, if an original document is mounted on a glass of a document plate, the scanner unit 12 scans image data of the original document by control of the scanner control unit 52. At Act 2, the scanner control unit 52 controls the scanner unit 12 to scan image information for which various image processings are performed after scanning by the scanner unit 12, via the image data interface 14, and stores the scanned image information into the storage unit 51 or the RAM 23 of the controller 11. At Act 3, the layout analyzing unit 53 reads the image data as a scan information stored in the storage unit 51 or the RAM 23 and extracts layout information regarding character regions or image regions from the read image information. In addition, the layout analyzing unit 53 extracts character addition information which is drawing with the characters at the same time, from the read image information. The character addition information which is drawing with the characters at the same time is a characteristic amount which is arbitrarily added to each character includes information such as a color of a character, netting of a character or an underline or the like.

At Act 4, the OCR processing unit 54 converts the character region included in the layout information extracted by the layout analyzing unit 53 into character information. To be more specific, OCR processing unit 54 divides the character region included in the layout information extracted by the layout analyzing unit 53 into regions such as a character string, a chart, a photograph, etc. The OCR processing unit 54 cuts off a character per one character from the obtained character string, recognizes a character with respect to the cut-off character and converts the character into character information. The OCR processing unit 54 supplies the converted character information to the keyword extracting unit 55.

Figure 4:
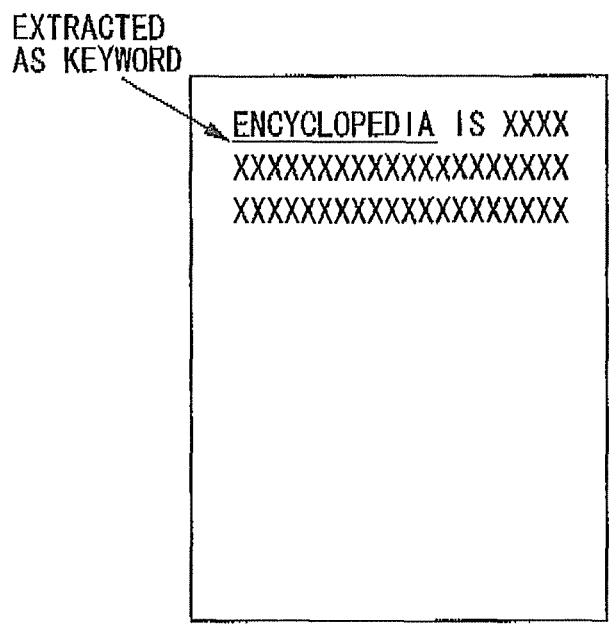
FIG. 4 is a diagram to illustrate an example of keywords extracted by the keyword extracting unit.

At Act 5, the keyword extracting unit 55 extracts characteristic characters, as a keyword, from a sentence configured of a plurality of characters, based on the character information from the OCR processing unit 54. The keyword extracting unit 55 extracts the characteristic characters (keyword) from the sentence, based on an image characteristic obtained at the time point of the layout analyzing unit 53 analyzing the layout or meaningful characteristic by a natural language analysis. FIG. 4 illustrates an example of the keyword extracted by the keyword extracting unit 55. In FIG. 4, the keyword extracting unit 55 extracts "encyclopedia" as a keyword.

Figure 5:
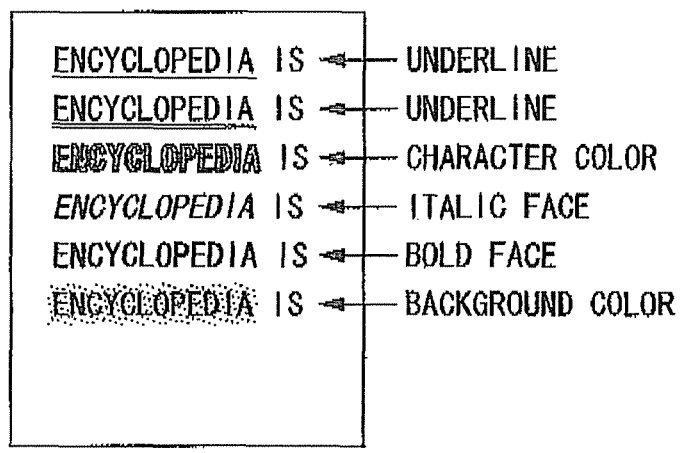
FIG. 5 is a diagram to illustrate an example of an image characteristic added to characters of a sentence.

Particularly, in extracting characteristic characters from a sentence based on an image characteristic, the keyword extracting unit 55 extracts characteristic characters from a sentence as follows. In other words, as shown in FIG. 5, if an image which becomes a character string has a shape different from peripheral characters, such as a colored character, an italic face character, a bold face character, a netting character, an underlined character, or a background-colored character, an image characteristic regarding the shape thereof is obtained at a time point of analyzing an layout as character addition information and the characteristic characters of characters are extracted based on the information regarding the shape thereof. Of course, other information may be used as the information regarding the shape.

In addition, in extracting characteristic characters from a sentence, based on a meaningful characteristic, the keyword extracting unit 55 extracts characteristic characters from a sentence as follows. In other words, the keyword extracting unit 55 extracts a portion which is estimated to have a meaning as a sentence due to a natural language analysis on the basis of a result of the OCR processing, as the characteristic characters of the sentence. To be more specific, the keyword extracting unit 55 extracts as a keyword, for example, a proper noun, a common noun or a subject (a word derived from a subject portion). If the storage unit 51 stores a word dictionary database, the keyword extracting unit 55 may extract a keyword by use of a weight coefficient (weight parameter) of words registered on the word dictionary database. In addition, a characteristic character of a sentence may be obtained based on an image characteristic or a meaningful characteristic due to a natural language analysis from the Web site connected via the external communication unit 26 and the network 31.

The keyword extracting unit 55 supplies the keyword information regarding the characteristic characters (keyword) extracted from the sentence to the keyword searching unit 56. At Act 6, the keyword searching unit 56 obtains the keyword information supplied from the keyword extracting unit 55, uses a search service or a dictionary service on a predetermined Web site via the communication control unit 57 by use of the obtained keyword information. The communication control unit 57 connects to a predetermined Web site via the external communication unit 26 in accordance with an instruction from the keyword searching unit 56. At Act 7, the keyword searching unit 56 obtains a search result (search information) via the communication control unit 57 to generate meta-information with use of the obtained search result.

The search service or the dictionary service in the embodiment of the present invention considers the following service. In other words, the search service or the dictionary service on the Web site searches associated information corresponding to the keyword or a Web page to describe the associated information, based on a keyword comprised of text data obtained from an external device via a network, and transmits the searched associated information or the Web page to the external device connected via the network. Such associated information as the meta-information is described in a data format of an HTML file or an XML file. In this case, in the embodiment of the present invention, the "meta-information" includes associated information corresponding to a keyword, a Web page or a URL (Uniform Resource Locator) regarding the Web page.

Although the embodiment of the present invention will be described using a dictionary service for brief description, not limited thereto, for example, a plurality of services are listed up and a service used for obtaining the search result may be properly selected. Such services may be updated if necessary, a new service may be added or an existing service may be deleted and changed.

Figure 6:
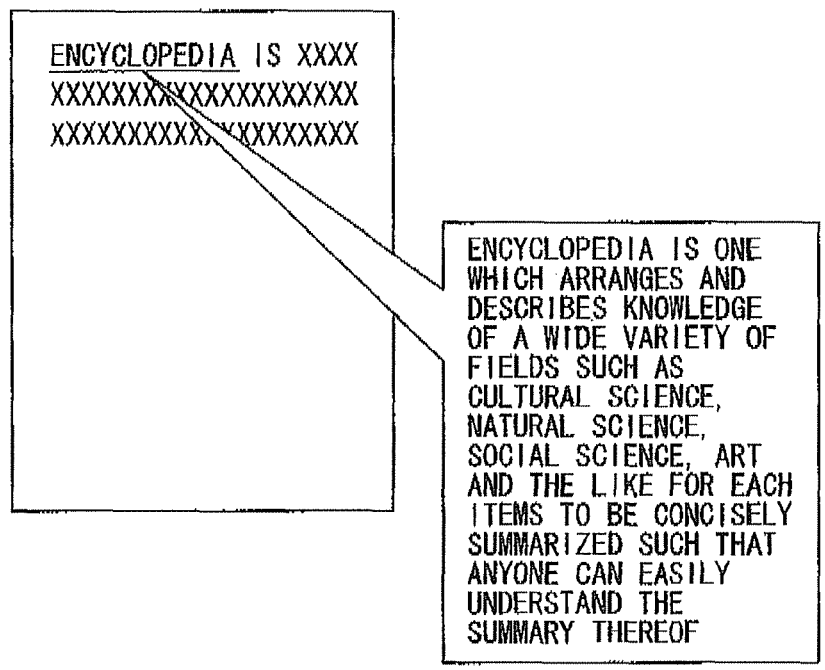
FIG. 6 is a diagram to illustrate an example of meta-information generated by the searching unit.

FIG. 6 illustrates an example of the search result obtained by the keyword searching unit 56. For example, an "encyclopedia" is assumed to be extracted as a keyword. Thereafter, the communication control unit 57 makes request for question using the keyword "encyclopedia" about a service on a predefined Web site via the external communication unit 26. If the service on the Web site receives the request for question from the external communication unit 26 of the image processing apparatus 1, the service on the Web site searches by use of the received keyword "encyclopedia." The service on the Web site transmits the meta-information including, for example, a Web page or a URL regarding the Web page to the image processing apparatus 1. The external communication unit 26 of the image processing apparatus 1 receives the search result from the service on the Web site. The image processing apparatus 1 generates the meta-information with use of the obtained search result.

In FIG. 6, the meta-information corresponding the "encyclopedia" extracted as a keyword is text data of a content that "an encyclopedia is one which arranges and describes knowledge of a wide variety of fields such as cultural science, natural science, social science, art and the like for each items to concisely summarize such that anyone can easily understand the summary thereof."

Figure 7:
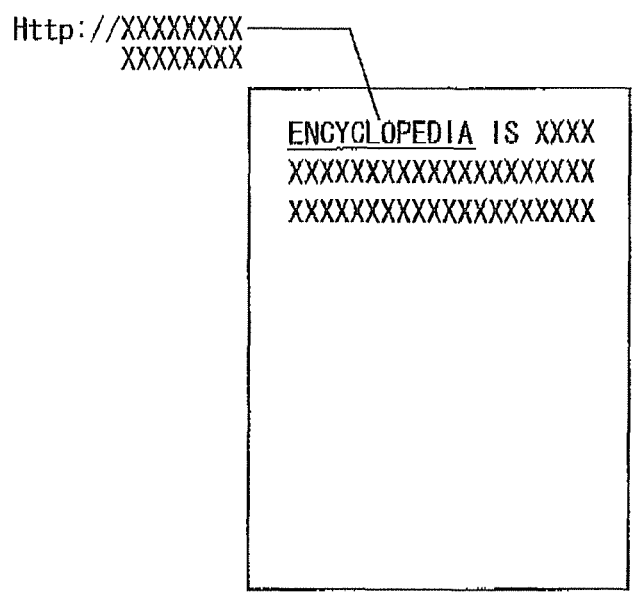
FIG. 7 is a diagram to illustrate an example of meta-information generated by the searching unit.

FIG. 7 illustrates another example of the meta-information generated by the keyword searching unit 56. In FIG. 7, the meta-information corresponding to the "encyclopedia" extracted as a keyword is a URL regarding a Web page which is "http://xxxxxxxxxxxxxxxxxx."

The keyword searching unit 56 supplies the obtained search result to the electronic document generating unit 58. At Act 8, the electronic document generating unit 58 receives the meta-information supplied from the keyword searching unit 56 and reads the character information stored in the storage unit 51. The electronic document generating unit 58 generates an electronic document according to, for example, a description of a PDF format or an XML format, based on the read character information. In this case, the electronic document generating unit 58 associates information regarding the position of the character included in the character information with the obtained meta-information and thereby adds the meta-information to the character information for generating an electronic document. In other words, the electronic document generating unit 58 generates an electronic document by embedding the meta-information into the character information.

Figure 8:
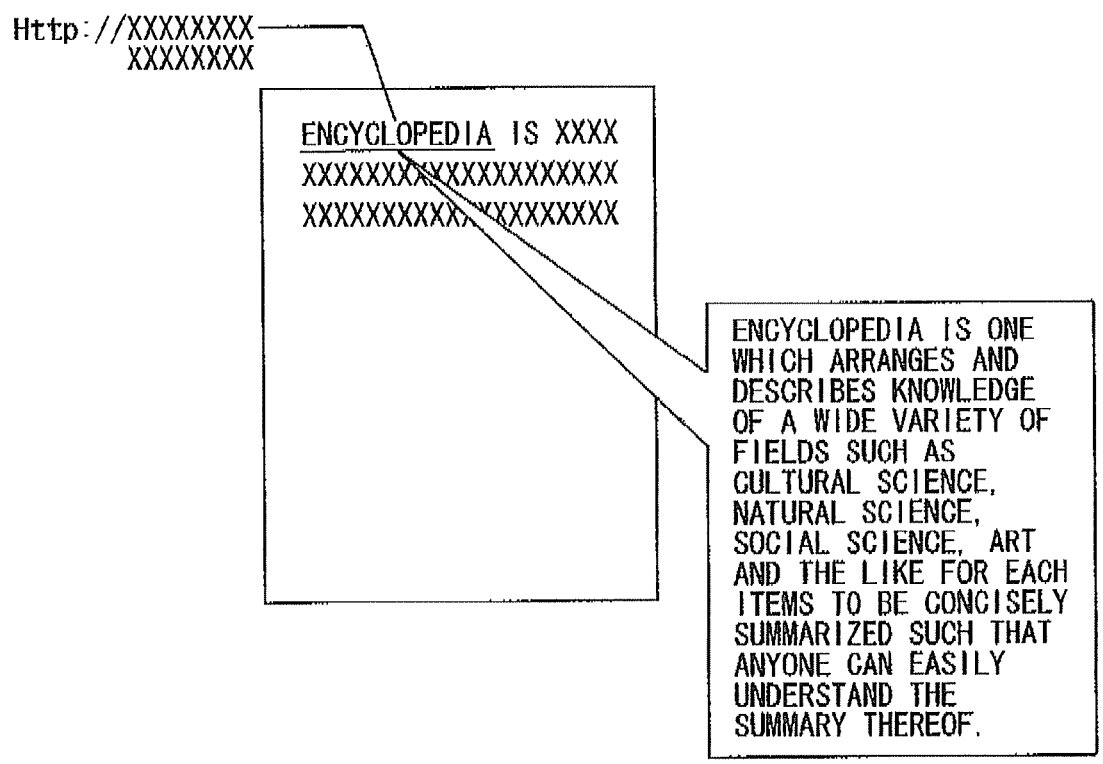
FIG. 8 is a diagram to illustrate an example of meta-information generated by the searching unit.

To be more specific, in FIG. 6, the electronic document is generated after adding the text data of the content that "an encyclopedia is one which arranges and describes knowledge of a wide variety of fields such as cultural science, natural science, social sciences art and the like for each items to concisely summarize such that anyone can easily understand the summary thereof" to the "encyclopedia" extracted as a keyword of the character information. On the other hand, in FIG. 7, the electronic document is generated after adding the URL regarding the Web page which is http://xxxxxxxxxxxxxxxxxx to the "encyclopedia" extracted as a keyword of the character information. Of course, as shown in FIG. 8, an electronic document may be generated after adding either meta-information shown in FIGS. 6 and 7.

As above, in this embodiment, the meaningful text data of the keyword or the link information regarding the Web page (URL and so on) is added to the characteristic keyword of the electronic document, and, information secondly available upon generating electronic data from a paper document can be directly added on an electronic data format.

After the image processing apparatus 1 generates the electronic document which is electronic data, a personal computer 32 connected to the image processing apparatus 1 via the network 31 can display the generated electronic data by a viewer, for example, as shown in FIG. 6 or 7. Thereby, a user can browse the electronic document generated in the image processing apparatus 1. When a user is browsing the electronic document with the personal computer 32, the user easily has access to link information added to a keyword and can browse the electronic document associating with the meta-information which is a text note if it has a PDF format.

At Act 9, the electronic document generating unit 58 stores the generated electronic document into the storage unit 51 or the RAM 23 of the controller 11.

In the embodiment of the present invention, the image processing apparatus 1 can scan image information for an original document, extract layout information regarding character regions and character addition information added to characters within the character regions from the read image information, and convert the character regions included in the layout information into character information. In addition, the image processing apparatus 1 can extract one or more keywords comprised of a plurality of characters from the converted character information, search by use of the extracted keywords, generate the meta-information with use of the obtained search result and generate an electronic document according to a description of a predetermined format by adding the meta-information to the character information. Thereby, the image processing apparatus 1 generates secondly available efficient electronic document. Therefore, upon generating an electronic document, it is not necessary to divide secondary information and an electronic document itself to be reserved and also a dedicated hardware is not required upon display by a view. In addition, the secondary information moves accompanied by an electronic document and thus it is possible to properly manage data.

Specially, as a detailed usage of this embodiment, a user self-marks keywords present in an original document which is a paper document and thereby can intentionally generate keywords extractable by the keyword extracting unit 55 according to a preference of the user. Thus it is possible to intentionally generate data to which additional information is added more than information described on the original document. For example, a user underlines desired characters or character strings, or colors them with a highlighted marker, as a keyword, and thereby can briefly instruct the image processing apparatus 1 to extract the keyword. In this embodiment, it is possible to generate an electronic document for which meaningful information of the marked character string is prepared in advance, and, when a search is performed after generating an electronic document as well, an information amount itself which is a base upon search increases and thus the search is advantageous.

Second Embodiment

Figure 9:
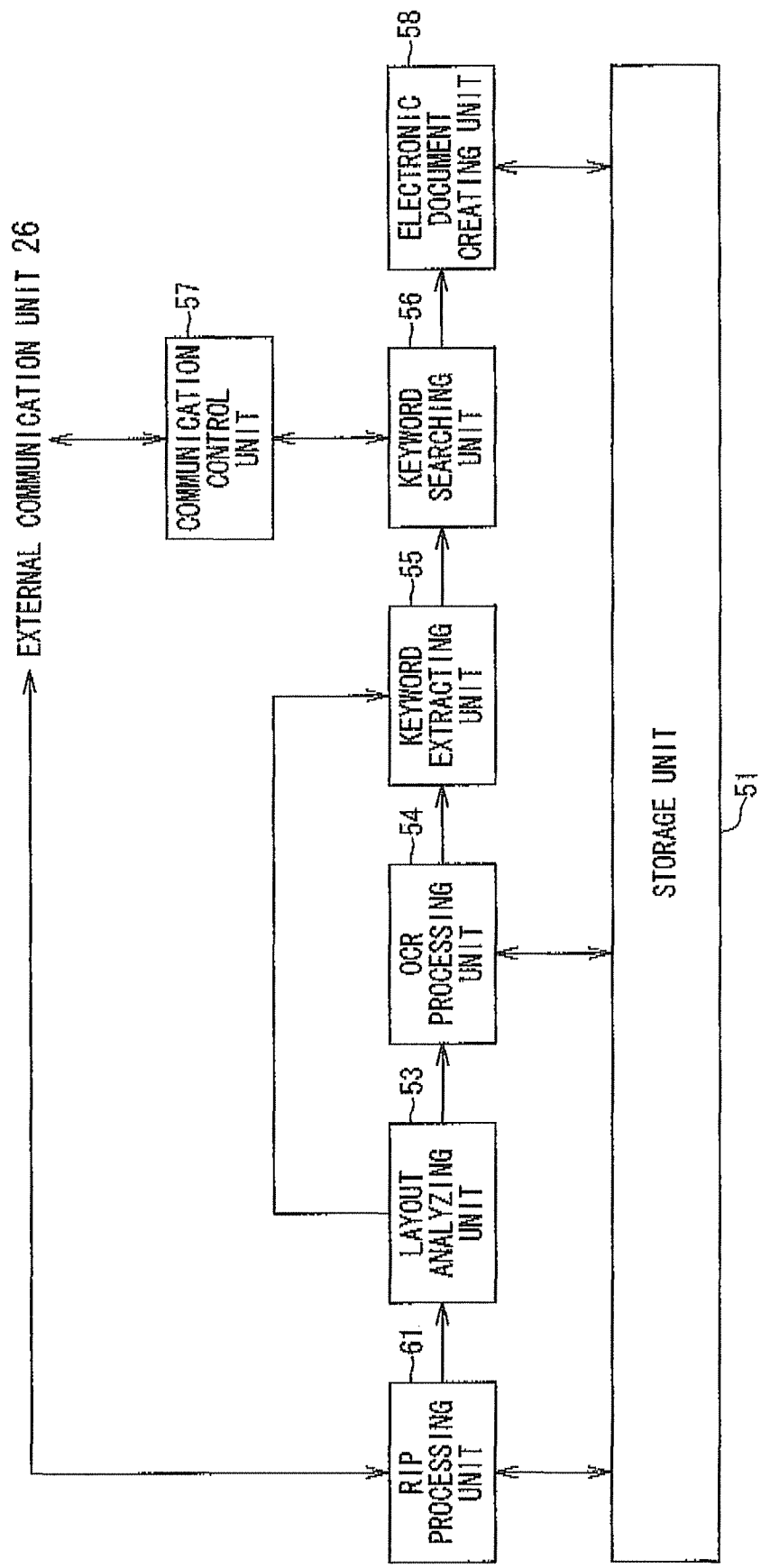
FIG. 9 is a diagram to illustrate a functional configuration executable by a CPU of a controller related to the second embodiment of the present invention.

FIG. 9 is a diagram to illustrate a functional configuration executable by a CPU 21 of a controller 11 related to the second embodiment of the present invention. As shown in FIG. 9, an image processing apparatus 1 includes, as a characteristic configuration of this invention, a layout analyzing unit 53, an OCR processing unit 54, a keyword extracting unit 55, a keyword searching unit 56, a communication control unit 57, an electronic document generating unit 58 and an RIP (Raster Image Processor) processing unit 61. Such configuration is mounted on the CPU 21 as software. Description of the elements corresponding to those in FIG. 2 is repeated and thus will be omitted.

The RIP processing unit 61 obtains a PDL (Page Description Language) file, which is generated by an application or a printer driver of the personal computer 32 connected thereto via the network 31, via the external communication unit 26 and the network 31, and analyzes the obtained PDL file to conversion into bitmap data. It is also possible to generate bitmap data representing a tag for displaying object information from information for the PDL file together with the bitmap data.

Figure 10:
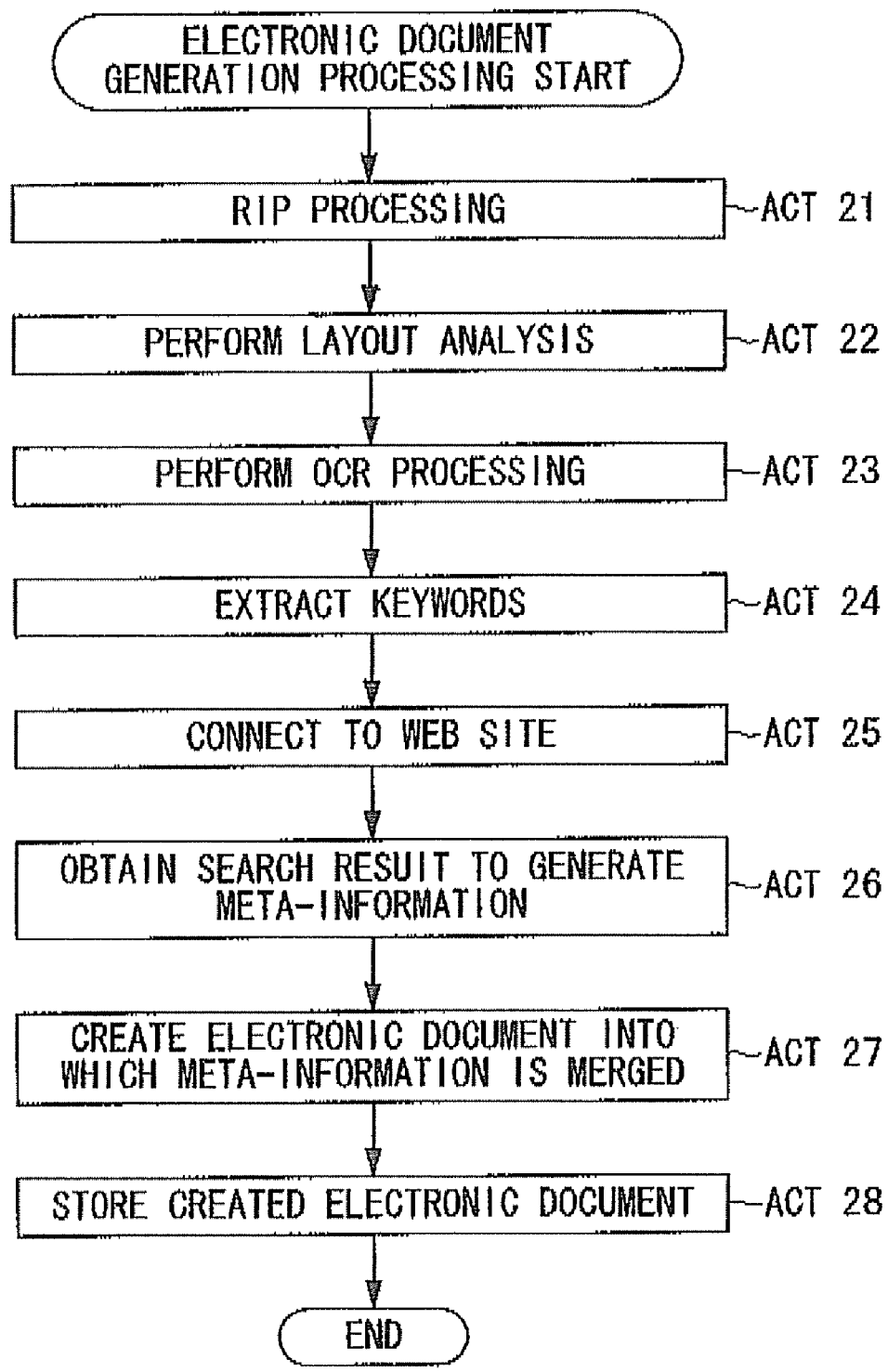
FIG. 10 is a flowchart to illustrate an electronic document generation processing in the image processing apparatus shown in FIG. 9.

Referring to FIG. 10, an electronic document generation processing in the image processing apparatus 1 in FIG. 9 will now be described. In addition, the processings at Act 22 to Act 28 in FIG. 10 are basically the same as Act 3 to Act 9 in FIG. 3 and thus the description thereof is repeated and thus will be properly omitted.

At Act 21, the RIP processing unit 61 obtains a PDL (Page Description Language) file, which is generated by an application or a printer driver of the personal computer 32 connected thereto via the network 31, via the external communication unit 26 and the network 31, and analyzes the obtained PDL file to convert the PDL file into bitmap data. In this case, it is also possible to generate bitmap data representing a tag for displaying object information from information for the PDL file together with the bitmap data.

At Act 22, after completion of the RIP processing, the layout analyzing unit 53 uses the bitmap data outputted from the RIP processing unit 61 to extract layout information regarding character regions or image regions. In this case, the layout analyzing unit 53 also uses the tag information outputted from the RIP processing unit 61 to extract layout information. It is possible to analyze layout more accurately than a case of using only an image by using the tag information upon extracting the layout information. Thereafter, the processing proceeds to Act 23 and then the OCR processing is performed to generate meta-information in Act 26.

In the embodiment of the present invention, the image processing apparatus 1 can analyze a file generated as a predetermined format to generate bitmap data, extract layout information regarding character regions and character addition information added to character within the character regions from the generated bitmap data, and convert the character regions included in the layout information into character information. In addition, the image processing apparatus 1 can extract one or more keywords comprised of a plurality of characters from the converted character information, search by use of the extracted keywords, generate meta-information with use of the obtained search result and generate an electronic document according to description of a predetermined format by adding the meta-information to the character information.

Thereby, in reserving an image after an RIP processing as an electronic document, it is possible to properly add secondly available information to electronized information and embed secondly available information into an electronic document, resulting in generating a secondly available efficient electronic document.

In addition, a series of processings described in the embodiment of the present invention may be executed in software but may be executed in hardware.

Although Acts in the flowchart represent examples of the processings performed in time-sequence according to the described order in the embodiment of the present invention, it can also include parallel processings or separate processings which are not necessarily processed in time-sequence.

What is claimed is:

1. An image processing apparatus comprising:
a scanning unit configured to scan image information regarding an original document, the original document having character addition information associated with at least one word of the original document, the character addition information added manually to the original document;
an analyzing unit configured to extract layout information regarding character regions and the character addition information within the character regions from the image information scanned by the scanning unit;
an optical character recognition (OCR) processing unit configured to convert the character regions extracted by the analyzing unit into character information;
an extracting unit configured to extract the at least one word from the character information converted by the OCR processing unit in response to the at least one word having a predefined image characteristic in the character addition information;
a searching unit configured to perform a search by use of the at least one word extracted by the extracting unit and generate meta-information based on a result of the search; and
an electronic document generating unit configured to generate an electronic document according to a predetermined format by adding the meta-information to the character information.

2. The apparatus according to claim 1, wherein the predefined image characteristic includes at least one of a colored character, a netting character, an underlined character, or a background-colored character.

3. The apparatus according to claim 1, wherein the extracting unit is further configured to extract the at least one word by performing a natural language analysis for a portion which is estimated to have a meaning as a sentence.

4. The apparatus according to claim 1, further comprising a storage unit configured to store a word dictionary database, wherein the extracting unit is further configured to extract the at least one word by use of a weight coefficient of words registered on the word dictionary database stored in the storage unit.

5. The apparatus according to claim 1, further comprising a communication unit configured to communicate with an information providing apparatus connected to the image processing apparatus via a network, wherein the searching unit is configured to obtain the search information from the information providing apparatus via the communication unit.

6. The apparatus according to claim 1, wherein the search information includes associated information corresponding to the at least one word, a Web page in which the associated information is described, or a uniform resource locator (URL) regarding the Web page.

7. The apparatus according to claim 1, wherein the electronic document generating unit is configured to generate an electronic document according to description of a portable document format (PDF) format or an extensible markup language (XML) format.

8. The apparatus according to claim 1, wherein the electronic document generating unit is configured to generate the electronic document by associating information regarding a position of the at least one word in the character information with the meta-information and adding the meta-information to the character information.

9. An image processing method, comprising:
    scanning image information regarding an original document, the original document including character addition information added manually to at least one character string in the original document;
    extracting layout information regarding character regions and the character addition information added to the at least one character string within the character regions from the image information;
    converting the character regions included in the layout information into character information;
    extracting one or more keywords comprising the at least one character string from the character information in response to determining that the character addition information added to the at least one character string has a predefined image characteristic;
    searching by use of the one or more keywords and generating meta-information based on information retrieved by the searching; and
    generating an electronic document according to a description of a predetermined format by adding the meta-information to the character information.

10. The method according to claim 9, wherein the character addition information comprises a hand-made mark on the original document.

11. The method according to claim 9, wherein the predefined image characteristic includes at least one of a colored character a netting character, an underlined character, or a background-colored character.

12. The method according to claim 9, wherein the extracting the one or more keywords includes extracting the one or more keywords by performing a natural language analysis for a portion which is estimated to have a meaning as a sentence.

13. The method according to claim 9, further comprising storing a word dictionary database, wherein the extracting the one or more keywords includes extracting the one or more keywords by use of a weight coefficient of words registered on the word dictionary database.

14. The method according to claim 9, further comprising:
    preparing an image processing apparatus; and
    communicating with an information providing apparatus connected to the image processing apparatus via a network, wherein the searching comprises obtaining the search information from the information providing apparatus via the communication unit.

15. The method to claim 9, wherein the search information includes associated information corresponding to the one or more keywords, a Web page in which the associated information is described, or a uniform resource locator (URL) regarding the Web page.

16. The method according to claim 9, wherein the generating the electronic document includes generating the electronic document according to a description of a portable document format (PDF) format or an extensible markup language (XML) format.

17. The method according to claim 9, wherein the generating the electronic document includes generating the electronic document by associating information regarding a position of the at least one character string included in the character information with the meta-information and adding the meta-information to the character information.

18. An image processing apparatus comprising:
    a data generating unit configured to analyze a file generated as a predetermined format to generate bitmap data, the file including character addition information associated with at least one word contained in the file, the character addition information added manually to the file;
    an analyzing unit configured to extract layout information regarding character regions and the character addition information from the bitmap data generated by the data generating unit;
    an optical character recognition (OCR) processing unit configured to convert the character regions included in the layout information extracted by the analyzing unit into character information;
    an extracting unit configured to extract the at least one word from the character information converted by the OCR processing unit in response to the character addition information having a predefined image characteristic;
    a searching unit configured to perform a search based on the at least one word extracted by the extracting unit and generate meta-information in accordance with information retrieved by the search; and
    an electronic document generating unit configured to generate an electronic document according to a description of a predetermined format by adding the meta-information to the character information.

19. The apparatus according to claim 18, wherein the data generating unit is further configured to generate tag information for displaying object information from the file generated as the predetermined format.

* * * * *